(12) United States Patent
Ihlenburg et al.

(10) Patent No.: US 12,263,791 B2
(45) Date of Patent: Apr. 1, 2025

(54) VEHICULAR DRIVER MONITORING SYSTEM WITH CAMERA HAVING MICRO LENS ARRAY

(71) Applicant: MAGNA ELECTRONICS INC., Auburn Hills, MI (US)

(72) Inventors: Joern Ihlenburg, Berlin (DE); Goerg Pflug, Weil der Stadt (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 467 days.

(21) Appl. No.: 17/303,793

(22) Filed: Jun. 8, 2021

(65) Prior Publication Data

US 2021/0291751 A1 Sep. 23, 2021

Related U.S. Application Data

(63) Continuation of application No. 14/098,817, filed on Dec. 6, 2013, now abandoned.

(60) Provisional application No. 61/770,048, filed on Feb. 27, 2013, provisional application No. 61/734,457, filed on Dec. 7, 2012.

(51) Int. Cl.
*B60R 11/04* (2006.01)
*H04N 23/45* (2023.01)
*H04N 23/60* (2023.01)
*B60R 11/00* (2006.01)

(52) U.S. Cl.
CPC ............. *B60R 11/04* (2013.01); *H04N 23/45* (2023.01); *H04N 23/60* (2023.01); *B60R 2011/004* (2013.01)

(58) Field of Classification Search
CPC . B60R 11/04; B60R 2011/004; H04N 5/2258; H04N 5/232
See application file for complete search history.

(56) References Cited

U.S. PATENT DOCUMENTS

| | | |
|---|---|---|
| 5,149,956 A | 9/1992 | Norton |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |

(Continued)

FOREIGN PATENT DOCUMENTS

WO 2013081985 A1 6/2013

*Primary Examiner* — Thai Q Tran
*Assistant Examiner* — Jose M Mesa
(74) *Attorney, Agent, or Firm* — HONIGMAN LLP

(57) ABSTRACT

A vehicular driver monitoring system includes a camera having a field of view that includes at least a driver's head region within a cabin of a vehicle. The camera includes an imager having a two-dimensional array of photosensing elements. The camera includes a lens array of lens elements disposed at the array of photosensing elements of the imager. The lens elements are disposed over respective sub-arrays of photosensing elements for imaging light onto the respective sub-arrays of photosensing elements. With an illumination source operated to emit near infrared light to illuminate at least the driver's head region, and responsive at least in part to image processing by an image processor of image data captured by the sub-arrays of photosensing elements associated with the respective lens elements of the lens array, the system determines the head of a driver of the vehicle and the driver's facing direction.

31 Claims, 8 Drawing Sheets

(56) References Cited

U.S. PATENT DOCUMENTS

| | | |
|---|---|---|
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,567,975 A | 10/1996 | Walsh et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,665,959 A | 9/1997 | Fossum et al. |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,322 A | 8/1998 | Fossum et al. |
| 5,793,420 A | 8/1998 | Schmidt |
| 5,796,094 A | 8/1998 | Schofield et al. |
| 5,811,815 A | 9/1998 | Marshall et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,880,691 A | 3/1999 | Fossum et al. |
| 5,883,739 A | 3/1999 | Ashihara et al. |
| 5,884,212 A | 3/1999 | Lion |
| 5,886,659 A | 3/1999 | Pain et al. |
| 5,890,021 A | 3/1999 | Onoda |
| 5,896,085 A | 4/1999 | Mori et al. |
| 5,899,956 A | 5/1999 | Chan |
| 5,909,026 A | 6/1999 | Zhou et al. |
| 5,915,800 A | 6/1999 | Hiwatashi et al. |
| 5,923,027 A | 7/1999 | Stam et al. |
| 5,924,212 A | 7/1999 | Domanski |
| 5,929,800 A | 7/1999 | Zhou et al. |
| 5,949,331 A | 9/1999 | Schofield et al. |
| 5,949,483 A | 9/1999 | Fossum et al. |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,021,172 A | 2/2000 | Fossum et al. |
| 6,049,171 A | 4/2000 | Stam et al. |
| 6,057,539 A | 5/2000 | Zhou et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,107,618 A | 8/2000 | Fossum et al. |
| 6,107,619 A | 8/2000 | Cunningham et al. |
| 6,124,819 A | 9/2000 | Zhou et al. |
| 6,144,022 A | 11/2000 | Tenenbaum et al. |
| 6,175,300 B1 | 1/2001 | Kendrick |
| 6,175,383 B1 | 1/2001 | Yadid-Pecht et al. |
| 6,178,034 B1 | 1/2001 | Allemand et al. |
| 6,223,114 B1 | 4/2001 | Boros et al. |
| 6,227,689 B1 | 5/2001 | Miller |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,326,230 B1 | 12/2001 | Pain et al. |
| 6,333,759 B1 | 12/2001 | Mazzilli |
| 6,346,700 B1 | 2/2002 | Cunningham et al. |
| 6,370,329 B1 | 4/2002 | Teuchert |
| 6,373,050 B1 | 4/2002 | Pain et al. |
| 6,380,572 B1 | 4/2002 | Pain et al. |
| 6,384,413 B1 | 5/2002 | Pain |
| 6,392,315 B1 | 5/2002 | Jones et al. |
| 6,396,397 B1 * | 5/2002 | Bos .................. B60R 1/088 348/E7.086 |

(56) References Cited

U.S. PATENT DOCUMENTS

| | | |
|---|---|---|
| 6,411,204 B1 | 6/2002 | Bloomfield et al. |
| 6,430,303 B1 | 8/2002 | Naoi et al. |
| 6,442,465 B2 | 8/2002 | Breed et al. |
| 6,476,860 B1 | 11/2002 | Yadid-Pecht et al. |
| 6,497,503 B1 | 12/2002 | Dassanayake et al. |
| 6,519,371 B1 | 2/2003 | Pain et al. |
| 6,539,306 B2 | 3/2003 | Turnbull |
| 6,546,148 B1 | 4/2003 | Yadid-Pecht et al. |
| 6,547,133 B1 | 4/2003 | Devries, Jr. et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,606,122 B1 | 8/2003 | Shaw et al. |
| 6,611,610 B1 | 8/2003 | Stam et al. |
| 6,636,258 B2 | 10/2003 | Strumolo |
| 6,650,455 B2 | 11/2003 | Miles |
| 6,665,013 B1 | 12/2003 | Fossum et al. |
| 6,672,731 B2 | 1/2004 | Schnell et al. |
| 6,674,562 B1 | 1/2004 | Miles |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,721,464 B2 | 4/2004 | Pain et al. |
| 6,735,506 B2 | 5/2004 | Breed et al. |
| 6,741,377 B2 | 5/2004 | Miles |
| 6,744,353 B2 | 6/2004 | Sjonell |
| 6,762,867 B2 | 7/2004 | Lippert et al. |
| 6,787,749 B1 | 9/2004 | Zhou et al. |
| 6,794,119 B2 | 9/2004 | Miles |
| 6,795,221 B1 | 9/2004 | Urey |
| 6,801,258 B1 | 10/2004 | Pain et al. |
| 6,819,231 B2 | 11/2004 | Berberich et al. |
| 6,823,241 B2 | 11/2004 | Shirato et al. |
| 6,838,301 B2 | 1/2005 | Zheng et al. |
| 6,839,452 B1 | 1/2005 | Yang et al. |
| 6,850,156 B2 | 2/2005 | Bloomfield et al. |
| 6,889,161 B2 | 5/2005 | Winner et al. |
| 6,909,753 B2 | 6/2005 | Meehan et al. |
| 6,933,488 B2 | 8/2005 | Pain |
| 6,944,352 B1 | 9/2005 | Yadid-Pecht et al. |
| 6,946,978 B2 | 9/2005 | Schofield |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,606 B2 | 2/2006 | Schofield |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,338,177 B2 | 3/2008 | Lynam |
| 7,365,769 B1 | 4/2008 | Mager |
| 7,460,951 B2 | 12/2008 | Altan |
| 7,492,281 B2 | 2/2009 | Lynam et al. |
| 7,526,103 B2 | 4/2009 | Schofield et al. |
| 7,581,859 B2 | 9/2009 | Lynam |
| 7,592,928 B2 | 9/2009 | Chinomi et al. |
| 7,639,149 B2 | 12/2009 | Katoh |
| 7,681,960 B2 | 3/2010 | Wanke et al. |
| 7,724,962 B2 | 5/2010 | Zhu et al. |
| 7,741,961 B1 | 6/2010 | Rafii et al. |
| 7,952,490 B2 | 5/2011 | Fechner et al. |
| 8,013,780 B2 | 9/2011 | Lynam |
| 8,027,029 B2 | 9/2011 | Lu et al. |
| 8,058,977 B2 | 11/2011 | Lynam |
| 8,340,866 B2 | 12/2012 | Hanzawa et al. |
| 2002/0015153 A1 | 2/2002 | Downs |
| 2002/0113873 A1 | 8/2002 | Williams |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2005/0015201 A1 | 1/2005 | Fields et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0164221 A1 | 7/2006 | Jensen |
| 2006/0250501 A1 | 11/2006 | Wildmann et al. |
| 2006/0290479 A1 | 12/2006 | Akatsuka et al. |
| 2007/0104476 A1 | 5/2007 | Yasutomi et al. |
| 2008/0025571 A1 | 1/2008 | Nakao et al. |
| 2009/0093938 A1 | 4/2009 | Isaji et al. |
| 2009/0113509 A1 | 4/2009 | Tseng et al. |
| 2009/0177347 A1 | 7/2009 | Breuer et al. |
| 2009/0265069 A1 | 10/2009 | Desbrunes |
| 2010/0014711 A1* | 1/2010 | Camhi ............... B60K 35/00 382/104 |
| 2010/0228437 A1 | 9/2010 | Hanzawa et al. |
| 2011/0293142 A1 | 12/2011 | van der Mark et al. |
| 2012/0044066 A1 | 2/2012 | Mauderer et al. |
| 2012/0218412 A1 | 8/2012 | Dellantoni et al. |
| 2012/0262340 A1 | 10/2012 | Hassan et al. |
| 2013/0002873 A1 | 1/2013 | Hess |
| 2013/0124052 A1 | 5/2013 | Hahne |
| 2013/0129150 A1 | 5/2013 | Saito |
| 2013/0182160 A1* | 7/2013 | Pitter ............... H04N 5/3456 348/296 |
| 2014/0168415 A1 | 6/2014 | Ihlenburg et al. |
| 2014/0168437 A1 | 6/2014 | Rother et al. |
| 2014/0362209 A1 | 12/2014 | Ziegenspeck et al. |
| 2015/0085116 A1* | 3/2015 | Graumann ............ B60R 11/04 348/148 |
| 2015/0234569 A1* | 8/2015 | Hess ............... H04N 13/398 345/156 |

* cited by examiner

VEHICULAR DRIVER MONITORING SYSTEM WITH CAMERA HAVING MICRO LENS ARRAY

CROSS REFERENCE TO RELATED APPLICATIONS

The present application is a continuation of U.S. patent application Ser. No. 14/098,817, filed Dec. 6, 2013, which claims the filing benefits of U.S. provisional applications, Ser. No. 61/770,048, filed Feb. 27, 2013, and Ser. No. 61/734,457, filed Dec. 7, 2012, which are hereby incorporated herein by reference in their entireties.

FIELD OF THE INVENTION

The present invention relates to vehicles with cameras mounted thereon and in particular to vehicles with one or more exterior-facing cameras, such as forward facing cameras and/or sideward facing cameras and/or rearward facing cameras.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a camera for a vision system that utilizes one or more cameras or image sensors to capture image data of a scene exterior (such as forwardly) of a vehicle and provides a display of images indicative of or representative of the captured image data. The imager or camera of the vehicular vision system includes a pixelated imaging array of photosensing elements and a lens array disposed at the imaging array. The lens array comprises an array of lens elements for imaging light onto respective pixels or elements of the pixelated imaging array. The vision system may determine and provide disparity mapping to provide a stereo vision feature, especially in distances of less than about 3 m. The present invention thus may provide a camera or imager for a vehicular vision system that has reduced height and that may provide enhanced performance during parking maneuvers or vehicle maneuverings at or near objects.

These and other objects, advantages, purposes and features of the present invention will become apparent upon review of the following specification in conjunction with the drawings.

DETAILED DESCRIPTION OF THE INVENTION

Figure 1:
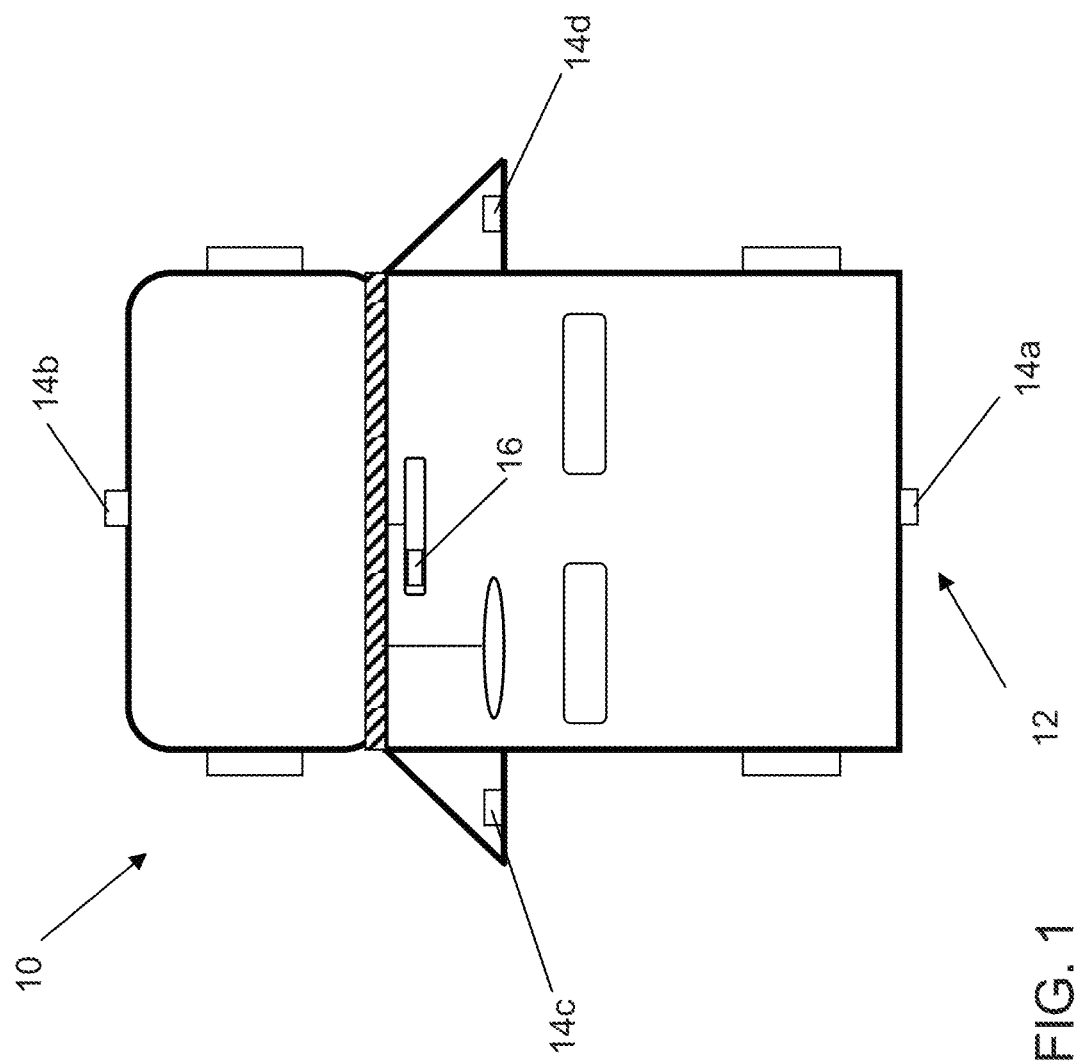
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at the front (or at the windshield) of the vehicle, and/or a sidewardly/rearwardly facing camera 14c, 14b at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

To have cameras integrated to vehicle side mirrors and into the rear portion or rear hatch of a vehicle is known. Having a two lens systems with different focus lengths projecting on one imager chip is described in U.S. patent application Ser. No. 13/534,657, filed Jun. 27, 2012, and published on Jan. 3, 2013 as U.S. Patent Publication No. US-2013-0002873, which is hereby incorporated herein by reference in its entirety. To use monolytic wafer level cameras with optics, imager and bus driver on one chip, optionally with tunable liquid lens and optionally using micromechanical elements (MEM) also referred to as DLP is described in International Publication No. WO 2013/081985, which is hereby incorporated herein by reference in its entirety. Micro lens cameras are sometimes used in cellular telephone applications.

Conventional vehicular cameras take a lot of space (such as about 3 cm by about 3 cm by about 5 cm or thereabouts), which limits the design options in hatch handle integrations (such as described in U.S. provisional application Ser. No. 61/736,103, filed Dec. 12, 2012, which is hereby incorporated herein by reference in its entirety) and mirror integrations, especially where the height of the camera is a concern. There are concerns with discriminating distances in regions that are less than about 50 cm from the camera or rearward of the vehicle when employing ultrasound sensor systems or wide angle or fish eye cameras.

The present invention provides an array camera for use as a vehicle rear camera, especially in hatch handle integration or the like, and/or as a surround view side camera, especially as integrated side mirror (housing) cameras, or the like.

Figure 2:
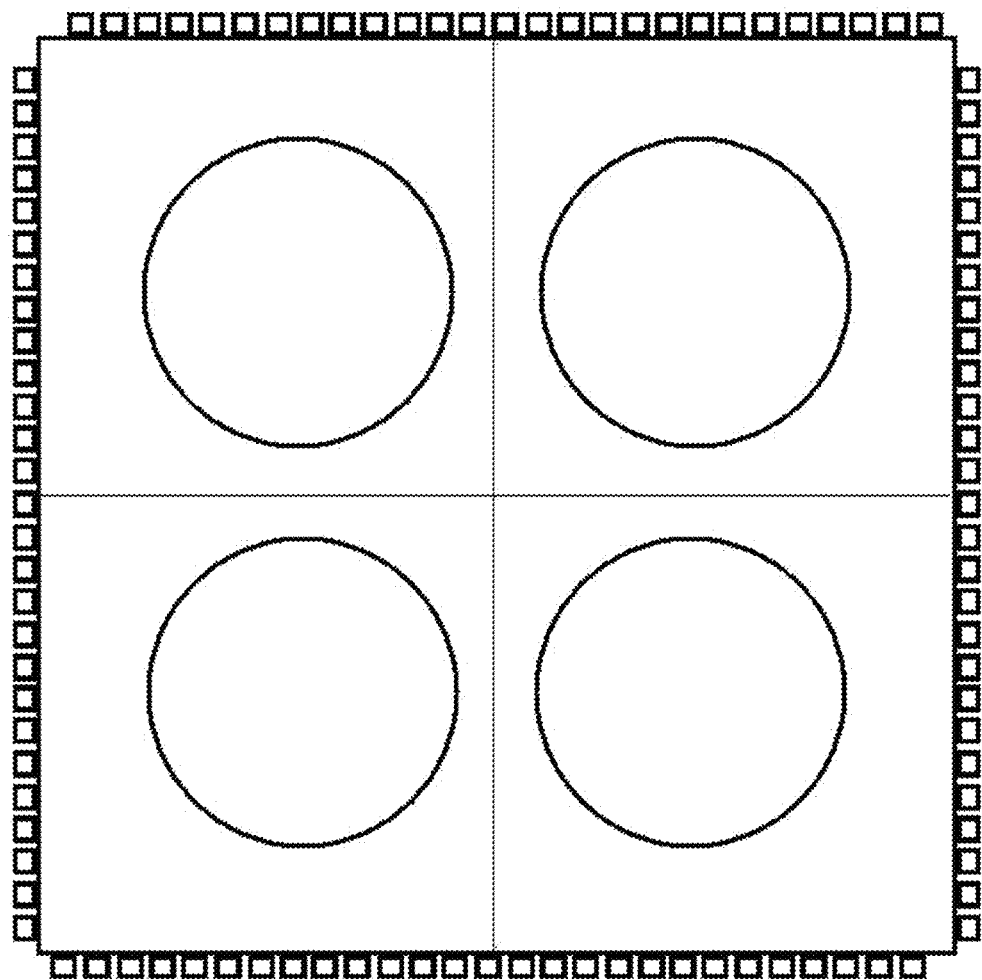
FIG. 2 is a schematic of a 2×2 lens array in accordance with the present invention.
Figure 3:
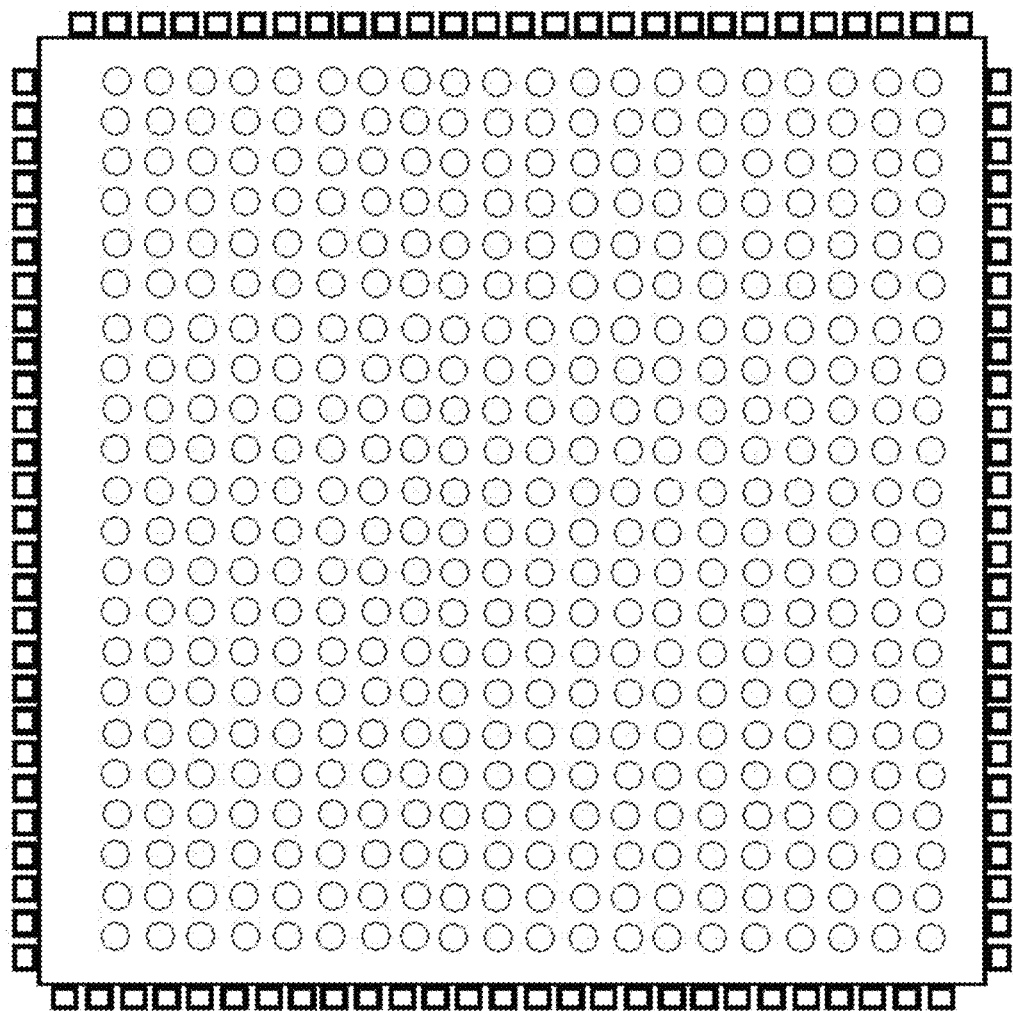
FIG. 3 is a schematic of an a X b lens array in accordance with the present invention.
Figure 4:
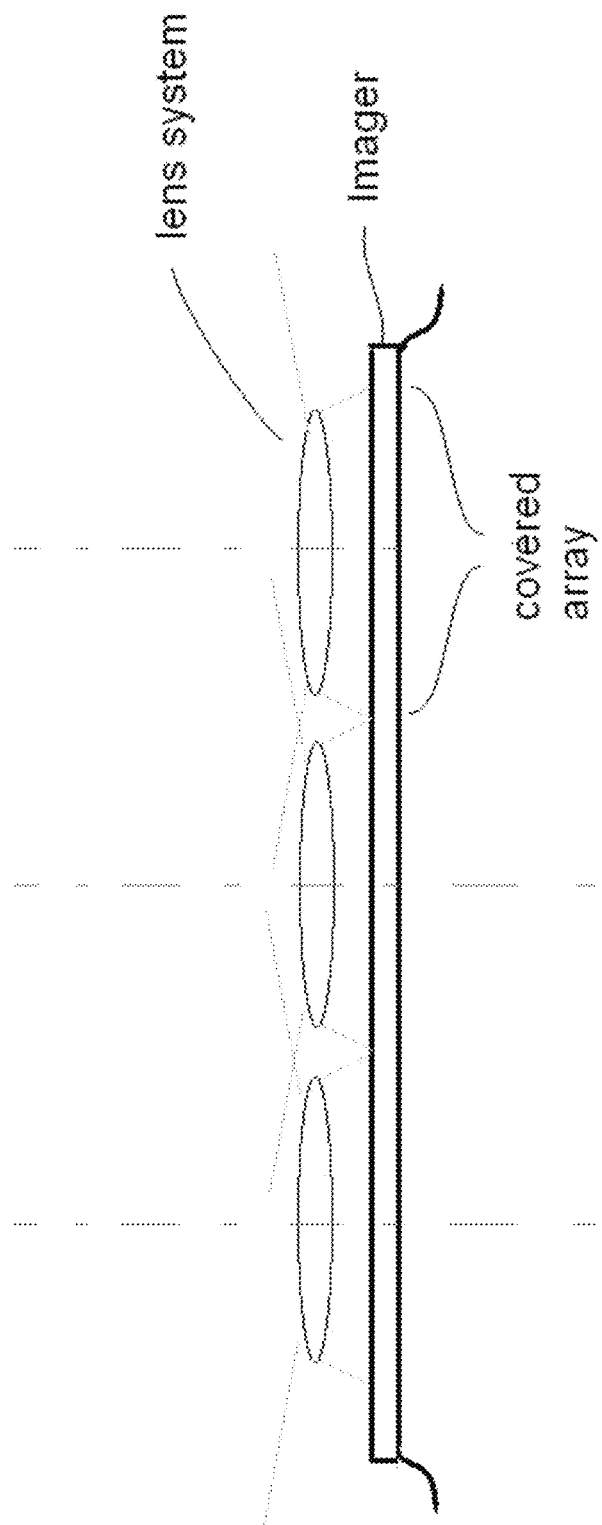
FIG. 4 is a side elevation of an image sensor and lens array in accordance with the present invention.
Figure 5:
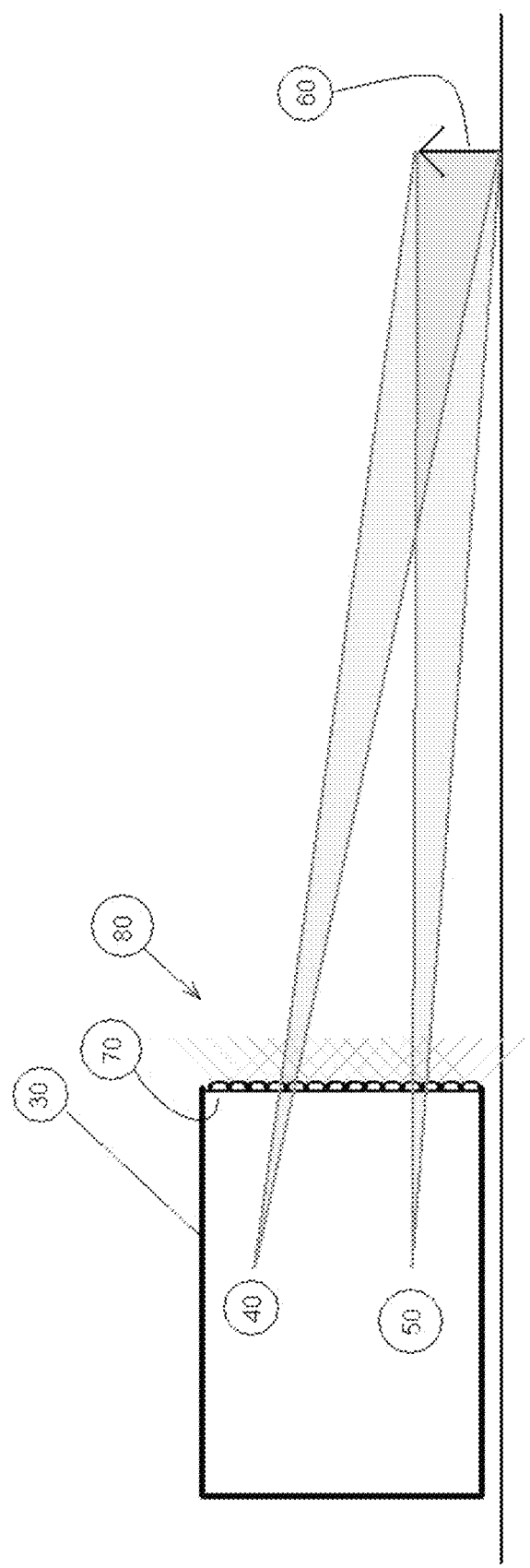
FIG. 5 is a schematic of a side view of a lens array light field camera 30 capturing a schematized object 60, with two possible virtual viewpoints shown at 40 and 50.

Array cameras employ several lens systems projecting on a limited number or couple of imager pixel arrays. Each array has its own lens. The arrays are in direct neighborhood covering the whole imager, such as can be seen in the schematics of FIGS. 2, 3 and 4. For example, and as shown in FIG. 2, the camera may have four lenses disposed over respective portions or arrays or sub-arrays of the imager (with each sub-array having, for example, about 500,000 pixels or photosensing elements for a two megapixel imager) or, for example, and as shown in FIG. 3, the camera may have multiple lenses (such as up to about 400 or more lenses) disposed over respective portions or arrays or sub-arrays of the imager (with each sub-array having, for example, about 5,000 pixels or photosensing elements for a two megapixel imager). Typically, each lens and sub-array produces one (merged) pixel or output (such as having 24 bit) in the resulting image of the light field. The achievements are that the lens systems can be made more primitive or less advanced, since there are redundant arrays covering at least in part the identical portion of the outside scene (as shown in FIGS. 4 and 5, the fields of view of the lenses overlap with other lenses and sub-arrays or covered array portions).

The barrel of the imager or camera may be designed much smaller or may even be eliminated, since the covered amount of pixels is smaller (for example, a conventional single lens may have to cover two million pixels (for a two megapixel or 2 MP imager), while the multiple lenses may each cover a much smaller number of pixels). Thus, each array's lens system may be substantially reduced in height.

Typically, all lens systems will have the same or identical or substantially the same focal length (such as for a wide angle lens from about 120 degrees to about 210 degrees) and typically all of the camera's viewing directions will be chosen to be substantially the same or identical (all in parallel). Thus, the disparity due to the array's distance will allow the system to do disparity mapping and by that to conceive stereo vision, especially in distances of less than about 3 m (which is interesting or a region of interest for vehicle parking scenes).

The image processing chain may be enabled to execute a valuable three dimensional or 3D construction (allowing for a determination of depth of the scene imaged by the camera or cameras). Another benefit of the present invention is that the camera can show short distances much more reasonable than a typical wide angle or fisheye lens camera. Thus, the system may be superior to ultra sound or ultrasonic sensor distance determination in critical distances of less than about 50 cm. At such distances of less than about 50 cm, the usual automotive ultrasound or ultrasonic sensors do not work well or do not work all due to wave reflection interference.

The imager may have a typical diagonal size, such as about ⅓" to ⅛" in diagonal size, and may, for example, comprise a megapixel imager, such as a 2 MP (megapixel) imager (or more) or the like.

Further or alternative configurations may have arrays on more than one imager arranged in a cluster or faceted eye configuration or arrays may be set up in a line (for higher disparity). The optics may comprise stack optics by PCBA's or the like.

Therefore, the present invention provides a vehicular vision system comprising one or more imagers or cameras, each having a pixelated imaging array of photosensing elements and a lens array disposed at the imaging array. The lens array comprises an array of lens elements for imaging light onto respective pixels or elements of the pixelated imaging array.

Further or alternative configurations may use or combine pixelated imaging array devices or cameras (such as wafer level cameras such as described in International Publication No. WO 2013/081985, which is hereby incorporated herein by reference in its entirety) into one or several light field cameras. Light field cameras are known in the scientific or experimental area of conventional photography and video taking. These applications allow the user to edit the focal point past the imaged scene and to move the view point within limited borderlines, and thus such cameras are also referred to as 4D cameras. Typically, the viewpoint can be shifted offline by the camera's width/height, with such a camera typically comprising about a 2 cm×2 cm imaging plane or array.

By generating view points from slightly different angles, a (real) stereo impression may be generated (allowing for determination of depths in the scene imaged by the cameras). FIG. 5 is a scheme of the principle of a light field camera 30, having a plurality of lenses or an array of lenses 70 disposed at an imager or imaging array of the camera. Each single lens or array 70 has a different position. The schematized ray's 80 represent the opening angle or field of view of each lens array 70. As shown in FIG. 5, the shift (in one dimension, such as in a vertical direction in FIG. 5) between virtual viewpoints 40 and 50 of a focused object 60 results in the object being viewed through different lenses and sub-arrays of the imaging array and lens array. Image processing of image data captured by the pixels of each lens or lens array can determine depth or distance to the detected object present in the field of view of the camera.

The system of the present invention may be used in conjunction with or as part of a driver detection or monitoring system or the like, such as for monitoring a driver's behavior or attentiveness or viewing direction or the like. Typically, there are two types of driver monitoring systems, such as a head tracking system and/or an eye tracking system. The first type typically has a stereo pair of conventional (non-array lens) near infra red (NIR) or visible light cameras, typically using ambient light or additional illumination targeted towards the driver's head. The second type typically has one camera and a structured light emitter. The emitter may be a LASER, a LED or a flashlight of suitable wavelength or other suitable illumination source. Optionally, and in accordance with the present invention, one light field camera (array camera) may be utilized in an in-cabin head and/or eye tracking system for tracking the driver's head and/or driver's eyes. The camera may be sensitive to NIR and/or to visible light. The system may acquire the camera view's depths and by that may determine the distance to the driver's head (and/or eyes and/or additional properties of the driver's body such as the driver's arms, hands, shoulders, mouth, chin nose and/or forehead) and an angle relative to the camera's viewing direction. By that, the system may determine the driver's facing direction and eye gaze direction without a second camera or directed or structured light emitter. The system of the present invention thus may operate with any suitable illumination.

To overcome the limitation in shifting the virtual viewpoint by just the camera's width/height, the same principle is used but by not using different array areas of a single camera, but a wider area covered by multiple cameras. Such an array formed by multiple lens cameras or preferably single lens cameras is called a 'Stanford light field camera' or 'Stanford light field array'.

Figure 6:
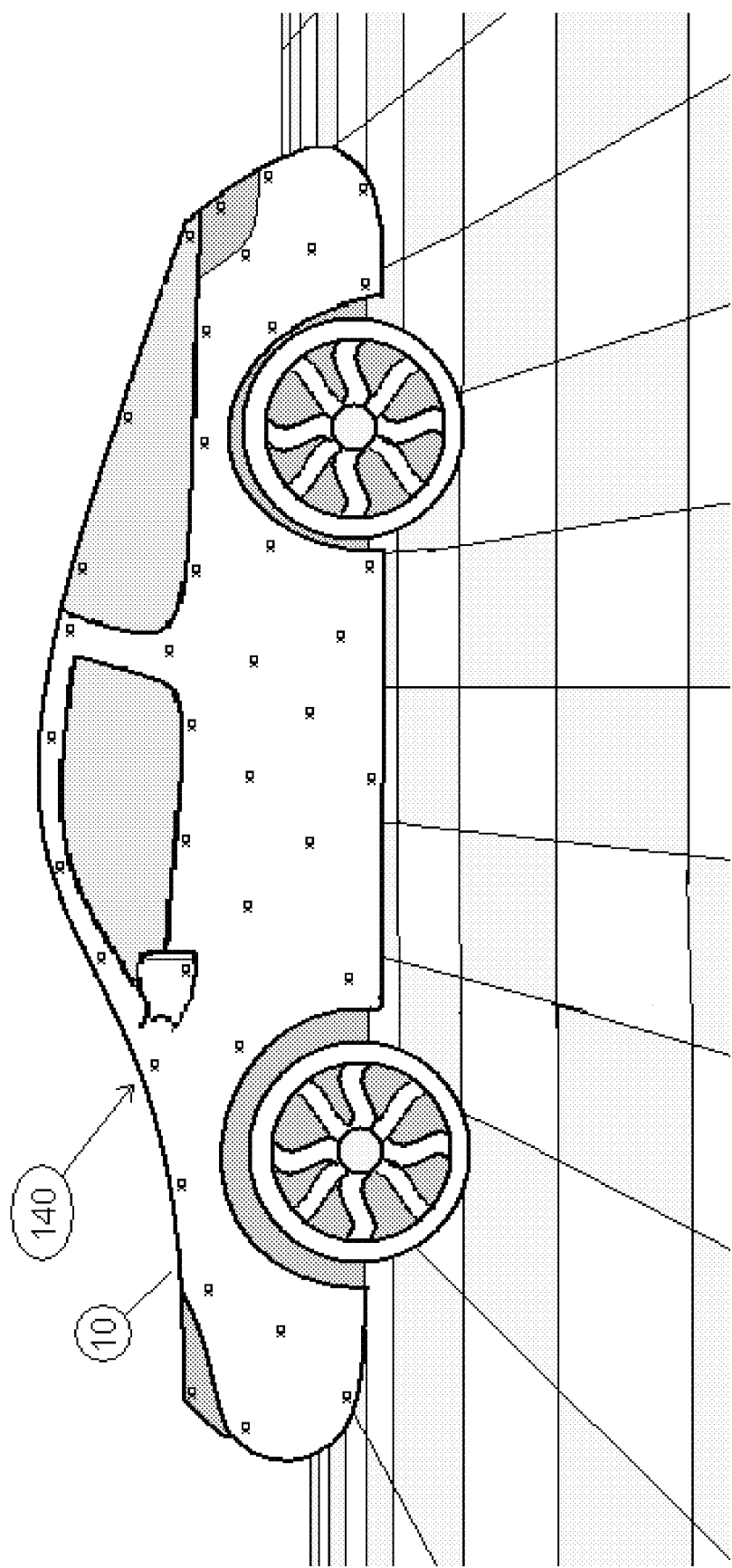
FIG. 6 shows a vehicle 10 with generally evenly (ideal for a Stanford Light Field) distributed cameras 140 (schematized) over the vehicle.
Figure 7:
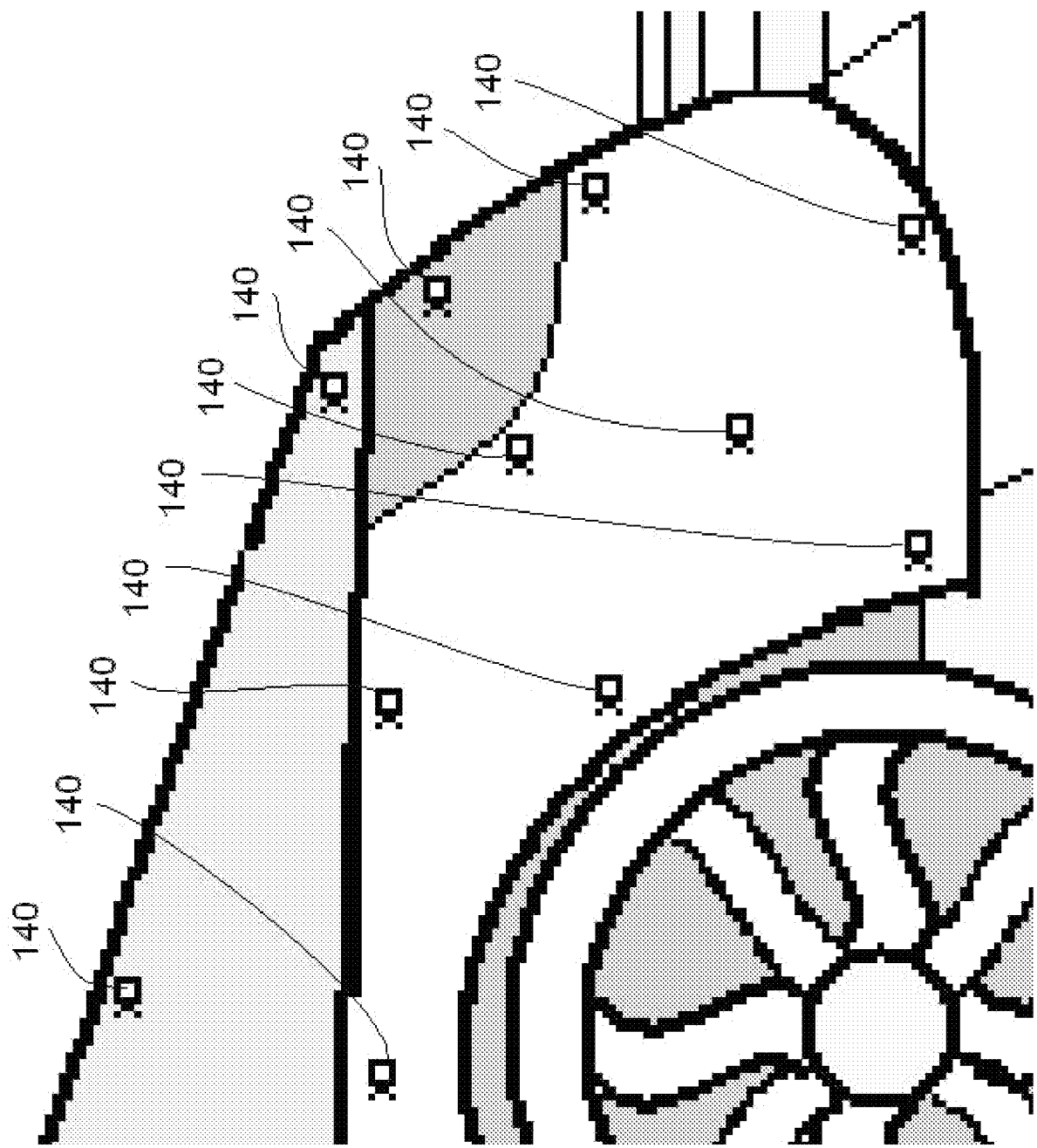
FIG. 7 shows an enlarged view of a rear portion of the vehicle of FIG. 6.

As another aspect of the present invention, a Stanford light field camera or array may be composed at a vehicle by using multiple cameras or multiples of the above mentioned monolithic wafer level cameras or two or more lens array cameras in and/or at a vehicle, such as for capturing images or image data representative of the inside of the vehicle, and/or such as for capturing images or image data representative of the area surrounding the vehicle or outside or exterior the vehicle. For example, and with reference to FIG. 6, a vehicle 10 may have generally evenly (ideal for a Stanford light field array) distributed cameras 140 at or over the exterior of the vehicle. FIG. 7 shows a sectional close up view of the rear portion of the vehicle with the cameras 140 disposed thereat. As can be seen in FIGS. 6 and 7, the cameras may be disposed in a spaced apart arrangement at the sheet metal or body portion of the vehicle and/or at the exterior mirrors and/or headlamps and/or taillights and/or exterior indicators/lights of the vehicle. The achievement will be that nearly every useful virtual viewpoint may be generatable for the imaging system with little to no optical restrictions and without severe image morphing operations (optically or by graphically computing).

Due to the relatively wide distances between the cameras (such as, for example, from about 20 cm to about 4 m or thereabouts), the environment surrounding the vehicle may be captured in true stereo vision. The light field cameras may be capable of providing or delivering a depth map of the scene in the field of view of the camera or cameras (providing depths and/or distances to objects present in the imaged scene), and this may be paired with delivering the scene's texture. By that, a Stanford light field array combines the properties of a conventional mono camera, which works in fusion, with a depth sensor, such as a LIDAR sensor or RADAR sensor (at least for a certain range). The depth map may be provided as an input to an advanced driver assistant system, such as, for example, a full or partially automated parking system for determining possible parking spaces or potential collision hazards, or a city mitigation system for conceiving the road scene in the path of the vehicle and possible hazards such as like inattentive pedestrians entering the road, and/or the like. Because the system captures image data and delivers image data or an image for processing, the system can employ classifiers to distinguish relevant objects from comparably less relevant or irrelevant objects and the system may track the moving directions of the objects since their distance is also determined.

Also, due to the comparably small number of pixels on a wafer level lens array, the image resolution of one array may not be very high, but because several wafer level cameras may add to a captured or composed image, the quality may be increased by image stacking and statistically waging methods, such as 'multi-frame super resolution' or the like. Because of vehicle design considerations, the even distribution of cameras may be difficult to achieve, especially where cameras placed at smooth surfaces may be unacceptable to the customer or vehicle manufacturer. Optionally, the vehicle may have or utilize materials at the camera that may be transparent to the camera's view, which allows to place the camera at any desired position. Optionally, the camera may operate in or be sensitive to light in the infrared and/or near infrared wave lengths, and the material disposed at or over the camera may be transmissive or at least partially or substantially transmissive to infrared and/or near infrared wave lengths of light.

Figure 8:
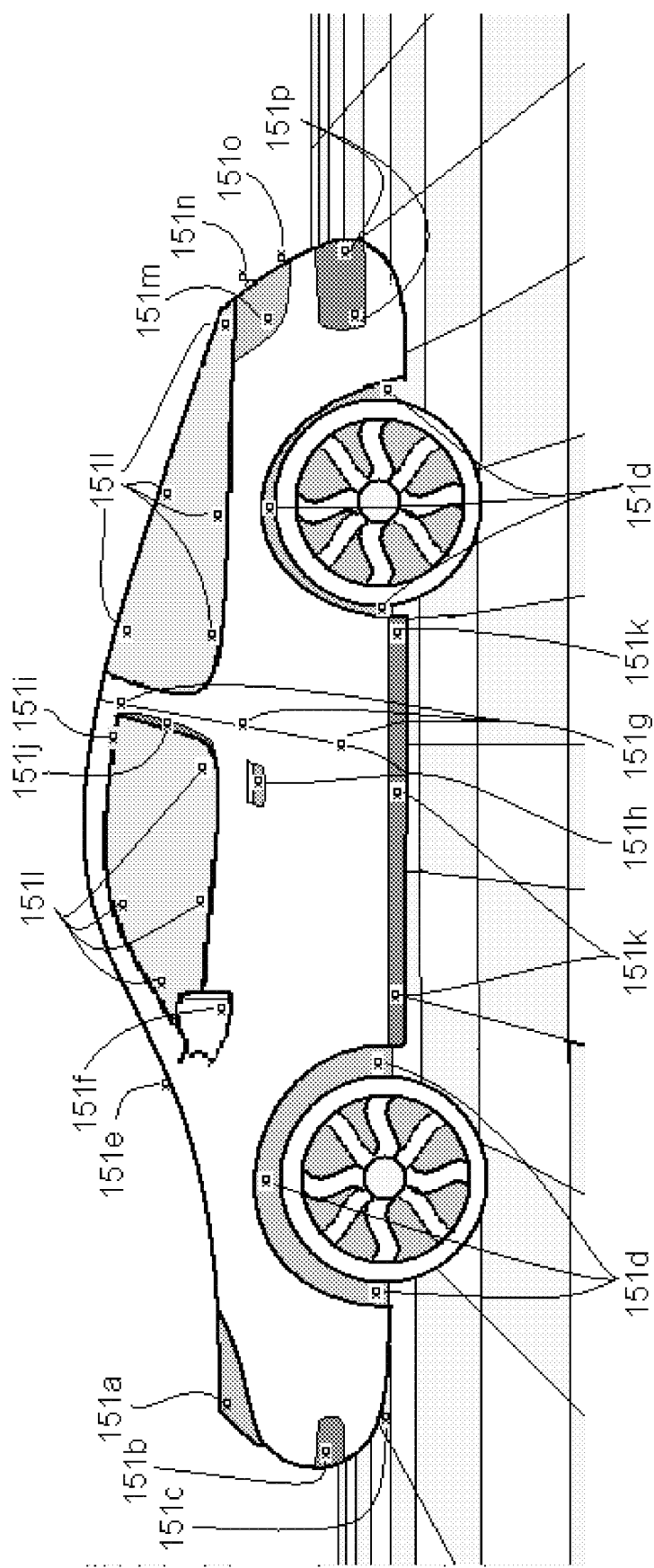
FIG. 8 shows a vehicle with cameras 151a-p distributed over the side area of the vehicle at hidden places.

More practically is the approach to place the cameras as well distributed as possible and at hidden locations at the vehicle. For example, and as shown in FIG. 8, a vehicle with cameras 151a-p (such as, for example, wafer level cameras) distributed at or over the vehicle at hidden locations or places (such as locations at or near or around windows, door handles, mirrors, wheel wells, bumpers, headlamps, taillights, indicators and/or the like, where the cameras may be hidden or not readily viewable or discernible and thus may be vehicle design wise acceptable). In the illustrated embodiment, the cameras may be:

head lamp integrated cameras 151a;
front bumper integrated cameras 151b;
wind skirt integrated cameras 151c;
wheel housing integrated cameras 151d;
integrated to windshield wiper cover cameras 151e;
side mirror integrated cameras 151f;
behind door gap cameras 151g;
door handle integrated cameras 151h;
window sealing integrated cameras 151i;
door pillar integrated cameras 151j;
door sill integrated cameras 151k;
compartment behind window cameras 151l;
tail light integrated cameras 151m;
rear trunk handle integrated cameras 151n;
rear license plate integrated cameras 151o; and/or
rear bumper integrated cameras 151p.

Clearly, other locations at or on the vehicle may be suitable as well. Some places may by less sufficient than others due to problems with pollution of the cameras, but due to the high redundancy of the imaging system (due to multiple cameras having overlapping fields of view), the system may be able to cope with the image limitations. Covered areas on one camera or camera array may be captured well by one or more other cameras or camera arrays, and the captured image of the other camera may replace entirely or in part the disturbed image captured by the covered or partially covered camera. The same may be done when a camera is off or damaged.

When using multiple wafer level cameras, it may be desirable to use low or reduced sophisticated communication interfaces. Optionally, for example, all or bunches or groups of cameras may share one or more common busses for communicating image data, commands, initialization and its position data to an image processing device (such as to a common image processor of the vehicle imaging system). It is known to transmit camera data and camera control data by LVDS on a twisted pair of wires or on coaxial cables. It may be possible to reduce the amount of data by utilizing image compression. Due to the fact that an image compression algorithm may have to run in each single camera, this add on may be too cost intensive in practice. Thus, a more powerful data communication bus, such as a flexray or other optical bus or the like, may be the data transmission medium of choice. Alternatively, all or some of the cameras may communicate wirelessly (digitally wireless LAN, Bluetooth or analog (FBAS) via radio transmission or the like) to an image processor or image processing system or the like. Optionally, the camera data and/or control data of one or multiple cameras may be transmitted via modulated carrier waves through coaxial cables, such as described in U.S. provisional application Ser. No. 61/864,837, filed Aug. 12, 2013, which is hereby incorporated herein by reference in its entirety.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (preferably a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/103193; WO 2012/0116043; WO 2012/0145501; WO 2012/0145343; WO 2012/154919; WO 2013/019707; WO 2013/016409; WO 2012/145822; WO 2013/067083; WO 2013/070539; WO 2013/043661; WO 2013/048994; WO 2013/063014; WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or U.S. patent application Ser. No. 14/082,573, filed Nov. 18, 2013, now U.S. Pat. No. 9,743,002; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013, now U.S. Pat. No. 9,707,896; Ser. No. 14/046,174, filed Oct. 4, 2013, now U.S. Pat. No. 9,723,272; Ser. No. 14/016,790, filed Oct. 3, 2013, now U.S. Pat. No. 9,761,142; Ser. No. 14/036,723, filed Sep. 25, 2013, now U.S. Pat. No. 9,446,713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published on Jan. 23, 2014 as U.S. Patent Publication No. US-2014-0025240; Ser. No. 13/942,753, filed Jul. 16, 2013, and published on Jan. 30, 2014 as U.S. Patent Publication No. US-2014/0028852; Ser. No. 13/927,680, filed Jun. 26, 2013, and published on Jan. 2, 2014 as U.S. Patent Publication No. US-2014/0005907; Ser. No. 13/916,051, filed Jun. 12, 2013, now U.S. Pat. No. 9,077,098; Ser. No. 13/894,870, filed May 15, 2013, now U.S. Pat. No. 10,089,537; Ser. No. 13/887,724, filed May 6, 2013, now U.S. Pat. No. 9,670,895; Ser. No. 13/852,190, filed Mar. 28, 2013, now U.S. Pat. No. 10,457,209; Ser. No. 13/851,378, filed Mar. 27, 2013, now U.S. Pat. No. 9,319,637; Ser. No. 13/848,796, filed Mar. 22, 2012, now U.S. Pat. No. 10,609,335; Ser. No. 13/847,815, filed Mar. 20, 2013, and published on Oct. 21, 2013 as U.S. Patent Publication No. US-2013-0286193; Ser. No. 13/800,697, filed Mar. 13, 2013, now U.S. Pat. No. 10,182,228; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published on Aug. 22, 2013 as U.S. Patent Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published on Jan. 3, 2013 as U.S. Patent Publication No. US-2013-0002873, and/or U.S. provisional applications, Ser. No. 61/901,127, filed Nov. 7, 2013; Ser. No. 61/905,461, filed Nov. 18, 2013; Ser. No. 61/905,462, filed Nov. 18, 2013; Ser. No. 61/895,610, filed Oct. 25, 2013; Ser. No. 61/895,609, filed Oct. 25, 2013; Ser. No. 61/893,489, filed Oct. 21, 2013; Ser. No. 61/886,883, filed Oct. 4, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/810,407, filed Apr. 10, 2013; Ser. No. 61/808,930, filed Apr. 5, 2013; Ser. No. 61/807,050, filed Apr. 1, 2013; Ser. No. 61/806,674, filed Mar. 29, 2013;

Ser. No. 61/793,592, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/766,883, filed Feb. 20, 2013; Ser. No. 61/760,366, filed Feb. 4, 2013; Ser. No. 61/760,364, filed Feb. 4, 2013; Ser. No. 61/756,832, filed Jan. 25, 2013; Ser. No. 61/754,804, filed Jan. 21, 2013; Ser. No. 61/736,104, filed Dec. 12, 2012; Ser. No. 61/736,103, filed Dec. 12, 2012; Ser. No. 61/733,598, filed Dec. 5, 2012 and/or Ser. No. 61/733,093, filed Dec. 4, 2012, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and published on Jan. 31, 2013 as International Publication No. WO 2013/016409, and/or U.S. patent application Ser. No. 13/534,657, filed Jun. 27, 2012, and published on Jan. 3, 2013 as U.S. Patent Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the above description constitutes a plurality of embodiments of the present invention, it will be appreciated that the present invention is susceptible to further modification and change without departing from the fair meaning of the accompanying claims.

The invention claimed is:

1. A vehicular driver monitoring system, the vehicular driver monitoring system comprising:

a camera disposed in a cabin of a vehicle and having a field of view that includes at least a driver's head region within the cabin of the vehicle, wherein the camera is operable to capture image data;

wherein the camera comprises an imager having an array of photosensing elements;

wherein the array of photosensing elements comprises a two-dimensional array of photosensing elements having at least one million photosensing elements arranged in a plurality of rows and a plurality of columns;

wherein the camera comprises a lens array disposed at the array of photosensing elements of the imager;

wherein the lens array of the camera comprises a two-dimensional array of lens elements arranged in a plurality of rows and a plurality of columns;

wherein the plurality of rows of the two-dimensional array of lens elements comprises (i) at least two rows of lens elements and (ii) at least two columns of lens elements;

wherein each lens element of the lens array is disposed over a respective sub-array of rows and columns of photosensing elements of the array of photosensing elements of the imager for imaging light onto the respective sub-array of rows and columns of photosensing elements of the array of photosensing elements of the imager;

an illumination source disposed in the cabin of the vehicle and operable to illuminate at least the driver's head region within the vehicle;

wherein the imager is sensitive to near infrared light, and wherein the illumination source, when operated, emits near infrared light;

an image processor operable to process image data captured by the camera; and wherein, with the illumination source operated to emit near infrared light, and responsive at least in part to image processing of image data captured by the sub-arrays of rows and columns of photosensing elements associated with the respective lens elements of the lens array of the camera, the vehicular driver monitoring system determines the head of a driver of the vehicle and determines the driver's facing direction.

2. The vehicular driver monitoring system of claim 1, wherein, responsive to image processing by the image processor of captured image data, the vehicular driver monitoring system acquires depth information of the driver's head region in the field of view of the camera.

3. The vehicular driver monitoring system of claim 2, wherein the depth information includes distance to the driver's head and a viewing angle of the camera relative to the driver's head.

4. The vehicular driver monitoring system of claim 2, wherein the vehicular driver monitoring system generates a depth map of the driver's head region based on the acquired depth information.

5. The vehicular driver monitoring system of claim 4, wherein the depth map is used by a driver assistant system of the vehicle.

6. The vehicular driver monitoring system of claim 2, wherein the depth information is used for tracking the driver's head.

7. The vehicular driver monitoring system of claim 2, wherein, with the illumination source operated to emit near infrared light, and responsive at least in part to image processing of image data captured by the sub-arrays of rows and columns of photosensing elements associated with the respective lens elements of the lens array of the camera, the vehicular driver monitoring system determines an eye gaze direction of the driver's eyes.

8. The vehicular driver monitoring system of claim 7, wherein the depth information is used for tracking the driver's eyes.

9. The vehicular driver monitoring system of claim 1, wherein, with the illumination source operated to emit near infrared light, and responsive at least in part to image processing of image data captured by the sub-arrays of rows and columns of photosensing elements associated with the respective lens elements of the lens array of the camera, the vehicular driver monitoring system determines the driver's hands.

10. The vehicular driver monitoring system of claim 1, wherein the image processor processes image data captured by the sub-arrays of rows and columns of photosensing elements of the imager of the camera to provide stereo vision.

11. The vehicular driver monitoring system of claim 10, wherein the lens elements of the lens array have similar focal lengths.

12. The vehicular driver monitoring system of claim 1, wherein the lens elements of the lens array image light onto respective sub-arrays having at least 500,000 photosensing elements.

13. The vehicular driver monitoring system of claim 1, wherein the lens elements of the lens array image light onto respective sub-arrays having at least 5,000 photosensing elements.

14. A vehicular driver monitoring system, the vehicular driver monitoring system comprising:
a camera disposed in a cabin of a vehicle and having a field of view that includes at least a driver's head region within the cabin of the vehicle, wherein the camera is operable to capture image data;
wherein the camera comprises an imager having an array of photosensing elements;
wherein the array of photosensing elements comprises a two-dimensional array of photosensing elements having at least one million photosensing elements arranged in a plurality of rows and a plurality of columns;
wherein the camera comprises a lens array disposed at the array of photosensing elements of the imager;
wherein the lens array of the camera comprises a two-dimensional array of lens elements arranged in a plurality of rows and a plurality of columns;
wherein the lens elements are disposed over respective sub-arrays of rows and columns of photosensing elements of the array of photosensing elements of the imager for imaging light onto the respective sub-arrays of rows and columns of photosensing elements of the array of photosensing elements of the imager;
an illumination source disposed in the cabin of the vehicle and operable to illuminate at least the driver's head region within the vehicle;
wherein the imager is sensitive to near infrared light, and wherein the illumination source, when operated, emits near infrared light;
an image processor operable to process image data captured by the camera; and
wherein, with the illumination source operated to emit near infrared light, and responsive at least in part to image processing of image data captured by the sub-arrays of rows and columns of photosensing elements associated with the respective lens elements of the lens array of the camera, the vehicular driver monitoring system determines the head of a driver of the vehicle and the driver's facing direction; and
wherein the image processor determines distance to the driver's head by comparing image data captured by said camera at different sub-arrays of rows and columns of photosensing elements.

15. The vehicular driver monitoring system of claim 1, wherein the illumination source comprises at least one near infrared light emitting diode.

16. The vehicular driver monitoring system of claim 1, wherein the illumination source comprises at least one near infrared laser.

17. A vehicular driver monitoring system, the vehicular driver monitoring system comprising:
a camera disposed in a cabin of a vehicle and having a field of view that includes at least a driver's head region within the cabin of the vehicle, wherein the camera is operable to capture image data;
wherein the camera comprises an imager having an array of photosensing elements;
wherein the array of photosensing elements comprises a two-dimensional array of photosensing elements having at least one million photosensing elements arranged in a plurality of rows and a plurality of columns;
wherein the camera comprises a lens array disposed at the array of photosensing elements of the imager;
wherein the lens array of the camera comprises a two-dimensional array of lens elements arranged in a plurality of rows and a plurality of columns;
wherein the plurality of rows of the two-dimensional array of lens elements comprises (i) at least two rows of lens elements and (ii) at least two columns of lens elements;
wherein each lens element of the lens array is disposed over a respective sub-array of rows and columns of photosensing elements of the array of photosensing elements of the imager for imaging light onto the respective sub-array of rows and columns of photosensing elements of the array of photosensing elements of the imager;

an illumination source disposed in the cabin of the vehicle and operable to illuminate at least the driver's head region within the vehicle;

wherein the imager is sensitive to near infrared light, and wherein the illumination source, when operated, emits near infrared light;

an image processor operable to process image data captured by the camera;

wherein, responsive to image processing by the image processor of captured image data, the vehicular driver monitoring system acquires depth information of the driver's head region in the field of view of the camera;

wherein the depth information includes distance to the head of a driver of the vehicle and a viewing angle of the camera relative to the driver's head;

wherein, with the illumination source operated to emit near infrared light, and responsive at least in part to image processing of image data captured by the sub-arrays of rows and columns of photosensing elements associated with the respective lens elements of the lens array of the camera, the vehicular driver monitoring system determines the driver's facing direction; and wherein, with the illumination source operated to emit near infrared light, and responsive at least in part to image processing of image data captured by the sub-arrays of rows and columns of photosensing elements associated with the respective lens elements of the lens array of the camera, the vehicular driver monitoring system determines an eye gaze direction of the driver's eyes.

18. The vehicular driver monitoring system of claim 17, wherein the vehicular driver monitoring system generates a depth map of the driver's head region based on the acquired depth information.

19. The vehicular driver monitoring system of claim 17, wherein the depth information is used for tracking the driver's head.

20. The vehicular driver monitoring system of claim 17, wherein the depth information is used for tracking the driver's eyes.

21. The vehicular driver monitoring system of claim 17, wherein, with the illumination source operated to emit near infrared light, and responsive at least in part to image processing of image data captured by the sub-arrays of rows and columns of photosensing elements associated with the respective lens elements of the lens array of the camera, the vehicular driver monitoring system determines the driver's hands.

22. The vehicular driver monitoring system of claim 17, wherein the illumination source comprises at least one near infrared light emitting diode.

23. The vehicular driver monitoring system of claim 17, wherein the illumination source comprises at least one near infrared laser.

24. A vehicular driver monitoring system, the vehicular driver monitoring system comprising:

a camera disposed in a cabin of a vehicle and having a field of view that includes at least a driver's head region within the cabin of the vehicle, wherein the camera is operable to capture image data;

wherein the camera comprises an imager having an array of photosensing elements;

wherein the array of photosensing elements comprises a two-dimensional array of photosensing elements having at least one million photosensing elements arranged in a plurality of rows and a plurality of columns;

wherein the camera comprises a lens array disposed at the array of photosensing elements of the imager;

wherein the lens array of the camera comprises a two-dimensional array of lens elements arranged in a plurality of rows and a plurality of columns;

wherein the plurality of rows of the two-dimensional array of lens elements comprises (i) at least two rows of lens elements and (ii) at least two columns of lens elements;

wherein each lens element of the lens array is disposed over a respective sub-array of rows and columns of photosensing elements of the array of photosensing elements of the imager for imaging light onto the respective sub-array of rows and columns of photosensing elements of the array of photosensing elements of the imager;

wherein the lens elements of the lens array image light onto respective sub-arrays having at least 5,000 photosensing elements;

an illumination source disposed in the cabin of the vehicle and operable to illuminate at least the driver's head region within the vehicle;

wherein the imager is sensitive to near infrared light, and wherein the illumination source, when operated, emits near infrared light;

an image processor operable to process image data captured by the camera;

wherein, responsive to image processing by the image processor of image data captured by the camera at different sub-arrays of rows and columns of photosensing elements of the imager of the camera, the vehicular driver monitoring system acquires depth information of the driver's head region in the field of view of the camera; and wherein, with the illumination source operated to emit near infrared light, and responsive at least in part to image processing of image data captured by the sub-arrays of rows and columns of photosensing elements associated with the respective lens elements of the lens array of the camera, the vehicular driver monitoring system determines the head of a driver of the vehicle and determines the driver's facing direction.

25. The vehicular driver monitoring system of claim 24, wherein the depth information is used for tracking the driver's head.

26. The vehicular driver monitoring system of claim 24, wherein, with the illumination source operated to emit near infrared light, and responsive at least in part to image processing of image data captured by the sub-arrays of rows and columns of photosensing elements associated with the respective lens elements of the lens array of the camera, the vehicular driver monitoring system determines an eye gaze direction of the driver's eyes.

27. The vehicular driver monitoring system of claim 26, wherein the depth information is used for tracking the driver's eyes.

28. The vehicular driver monitoring system of claim 24, wherein the depth information includes distance to the driver's head and a viewing angle of the camera relative to the driver's head.

29. The vehicular driver monitoring system of claim 24, wherein the image processor processes image data captured by the sub-arrays of rows and columns of photosensing elements of the imager of the camera to provide stereo vision.

30. The vehicular driver monitoring system of claim 24, wherein the illumination source comprises at least one near infrared light emitting diode.

31. The vehicular driver monitoring system of claim 24, wherein the illumination source comprises at least one near infrared laser.

* * * * *